Figure 7:
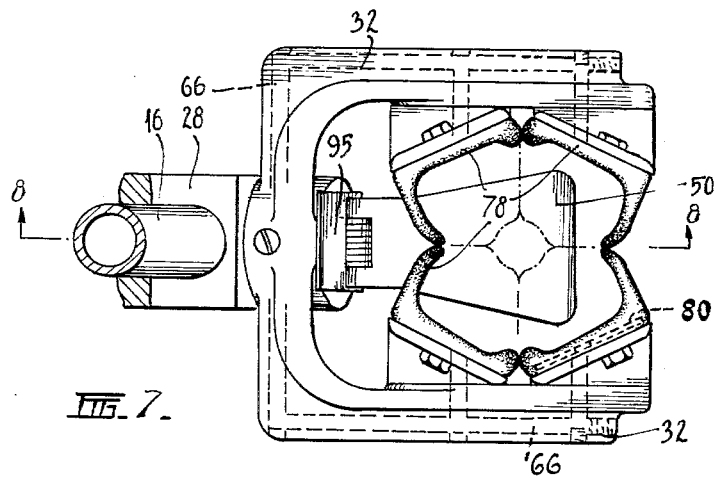

May 10, 1966  W. R. C. GEARY  3,250,251
LEG CLAMPS FOR ANIMALS
Filed March 23, 1964  4 Sheets-Sheet 1
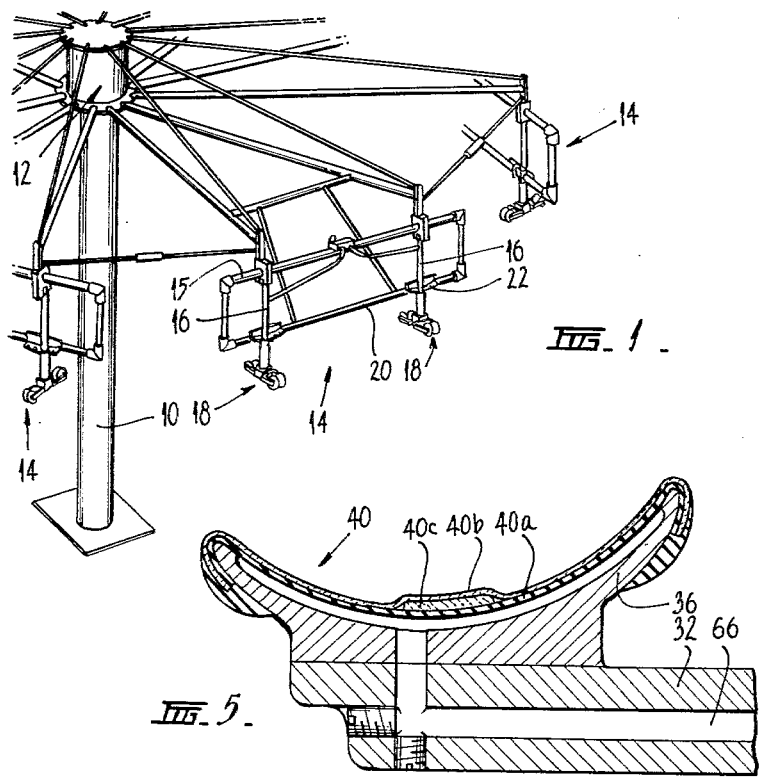
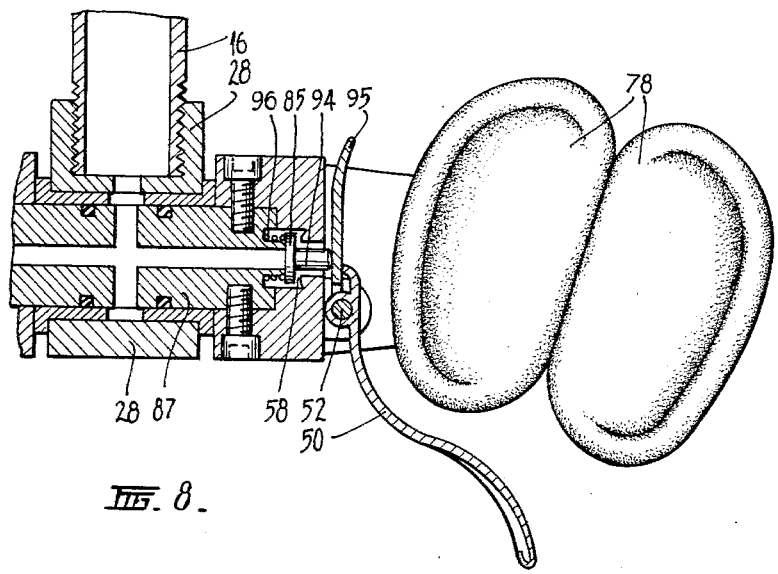
INVENTOR
WILLIAM R. C. GEARY
By Irwin S. Thompson
ATTY.

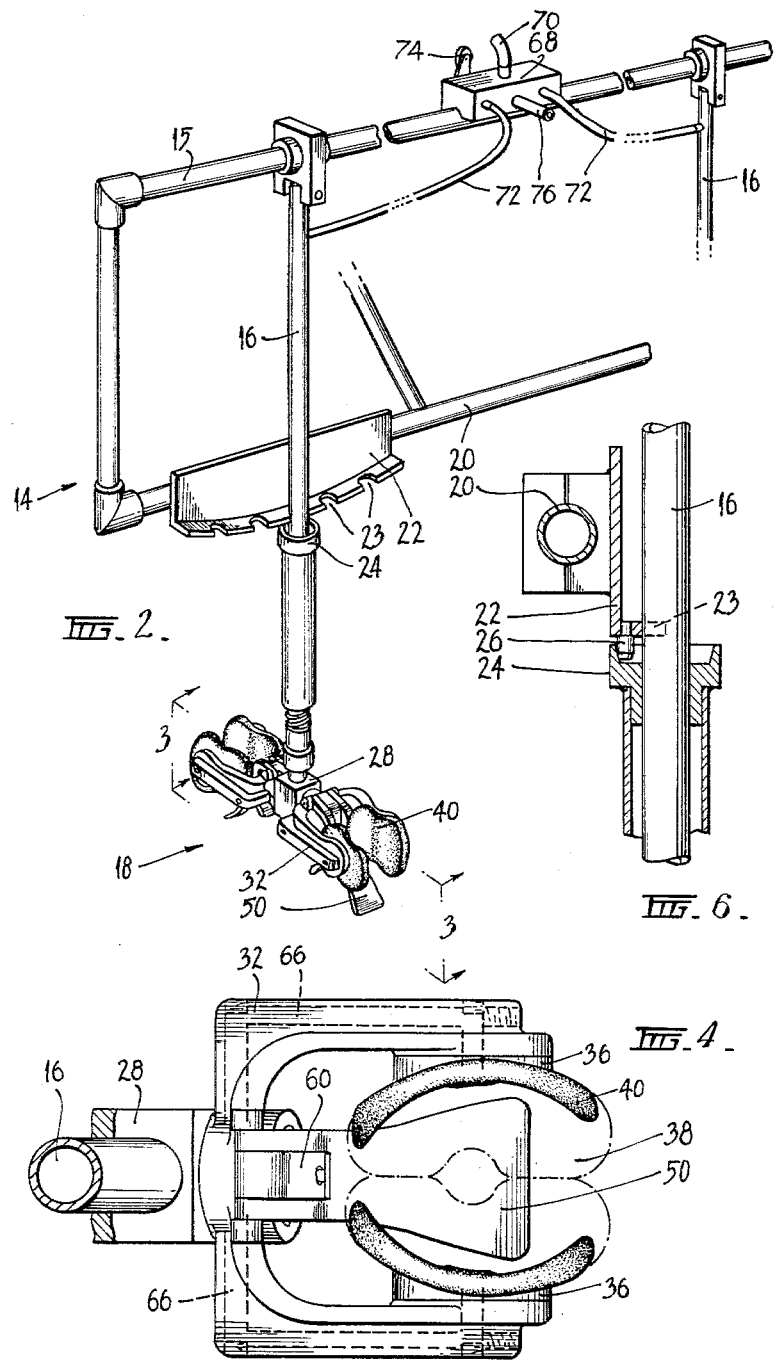

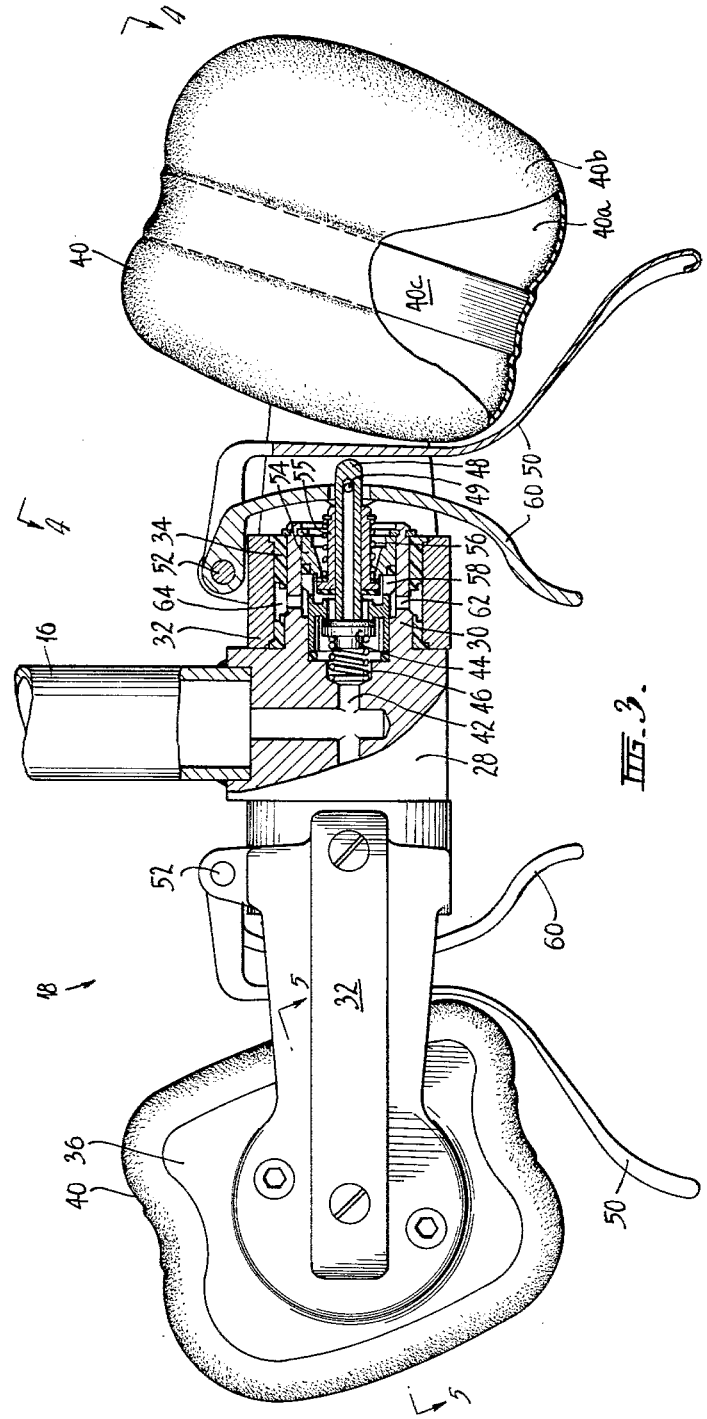

May 10, 1966  W. R. C. GEARY  3,250,251
LEG CLAMPS FOR ANIMALS
Filed March 23, 1964  4 Sheets-Sheet 4

INVENTOR
WILLIAM R. C. GEARY
By Irwin S. Thompson
ATTY.

United States Patent Office 3,250,251
Patented May 10, 1966

3,250,251
LEG CLAMPS FOR ANIMALS
William Richard Clifford Geary, 6 Allee St., Brighton, Victoria, Australia
Filed Mar. 23, 1964, Ser. No. 353,995
Claims priority, application Australia, Mar. 26, 1963, 28,774/63
9 Claims. (Cl. 119—98)

This invention relates to leg clamps for animals and refers particularly, but is not limited, to animal supporting apparatus comprising a plurality of spaced leg clamps and associated control means for suspending an animal by its four legs thereby to facilitate the carrying out of shearing and/or other treatment operations.

An animal leg clamp according to the invention comprises gripping means having spaced portions between which a leg of an animal may be arranged, and wherein one at least of said spaced portions is adapted to be forced inwardly by gaseous fluid pressure thereby to grip the leg securely.

The said gripping means is preferably mounted on a support so as to turn about an axis disposed approximately transversely to the leg for the purpose hereinafter explained.

According to an important form of the invention, four of the said clamps are arranged in two transversely opposed and longitudinally spaced pairs and valve means are provided whereby each clamp may be individually controlled to cause it to grip the respective leg of the animal and whereby the four clamps may be simultaneously released thereby to permit the animal to drop therefrom.

Preferably the said gripping means comprises spaced gripping members arranged to define an intervening side opening or gap through which the leg of the animal may be inserted.

At least one, and preferably each, of the said gripping members preferably comprises an inflatable member of resilient or flexible material.

According to another form of the invention, the said gripping means comprises a continuous ring or tube provided with an internal inflatable lining which expands inwardly when subjected to internal air pressure, thereby to grip a leg inserted thereinto through one end thereof.

Preferably the aforesaid valve means comprises an inflation valve individual to each clamp, said valve being preferably arranged for operation by the animal's leg as it is inserted into the clamp which is also preferably provided with an exhaust valve operable manually to effect the release of the clamp.

In addition, a further exhaust valve common to the several clamps of a group thereof is preferably provided whereby the several clamps may be released simultaneously.

Figure 9:
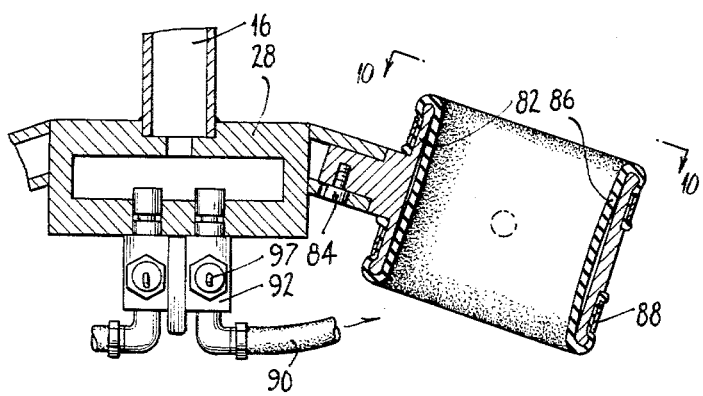
Figure 10:
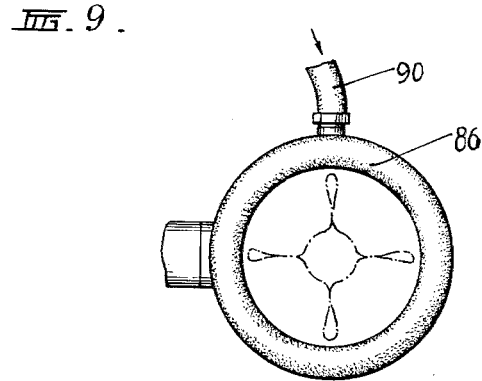

In the following more detailed description of representative forms of the invention, reference is made to the accompanying drawings in which:

FIGURE 1 is a perspective view of a portion of an elevated rotary frame fitted with a plurality of animal carriers incorporating leg clamps, FIGURE 2 is a perspective view to a larger scale showing a portion of one of the animal carriers, FIGURE 3 is a part sectional view in side elevation in the direction designated 3—3 in FIGURE 2, FIGURE 4 is a view in plan of one of the clamps as viewed in the direction designated 4—4 in FIGURE 3, FIGURE 5 is a view in sectional plan taken on the line 5—5 of FIGURE 3, FIGURE 6 is a view in vertical section of a locking device, FIGURE 7 is a part sectional view in plan of a leg clamp of modified construction, FIGURE 8 is a view in sectional elevational taken on the line 8—8 of FIGURE 7, FIGURE 9 is a view in sectional side elevation of another form of clamp, and FIGURE 10 is a view in plan of the clamp shown in FIGURE 7.

The apparatus shown diagrammatically in FIGURE 1 comprises a column 10 having a head frame generally designated 12 rotatively mounted on its upper end, this rotary head frame being provided at its periphery with a plurality of equally spaced depending carriers generally designated 14. Each carrier comprises a horizontal beam 15 supporting two longitudinally spaced depending arms 16, each fitted at its lower end with a transversely opposed pair of leg clamps, each generally designated 18. Thus each carrier is adapted to suspend an animal by its four legs so that by turning the head frame, each inverted animal may be moved in turn to and arrested at each of a plurality of stations including a loading station, a discharge station and a plurality of intervening stations at which various treatment operations may be carried out. The mechanism for rotating the head frame does not form a part of this invention and is not described in this specification.

The rotary head frame 12 thus serves as an elevated conveyor for the several animal carriers, though it is to be understood that various other types of elevated conveyors may alternatively be used.

Preferably the depending arms 16 are of hollow tubular form and have their upper ends pivotally connected to the respective carrier beam 15 in a manner such that the pairs of leg clamps 18 on their lower ends may be swung laterally and also towards and from each other to suit the size of the animals to be treated and means are preferably provided for locking the depending arms in alternative positions.

For this purpose, each carrier preferably includes a further bar 20 arranged horizontally at a suitable distance below the respective beam 15 and this further bar supports two spaced racks 22 each formed with spaced notches 23 for alternative engagement by the adjacent portion of the respective depending arm 16. Thus each depending arm may be swung laterally outwards to disengage the rack and then inwards to engage any selected notch after which it is suitably locked to the respective rack, e.g. by means of a slidable cup 24 which is urged upwardly by a spring to engage a depending locking pin 26, one of which is arranged adjacent to each notch, FIGURE 6.

Referring now to FIGURES 2, 3, 4 and 5, each depending tubular arm 16 is fitted at its lower end with a support member 28 formed with a diametrically opposed pair of laterally projecting hollow trunnions 30, each of which pivotally supports a clamp body 32 of U shape in plan having spaced arms projecting laterally outwards with respect to the central support member 28. A resilient plastic bush 34 is interposed between each trunnion and the bearing therefor on the respective clamp body 32.

An arcuate clamping plate 36 has its central portion secured to the inner face of the outer end portion of each arm of each clamp body so that these clamping plates are arranged in opposed pairs as best shown in FIGURE 4 and the gap 38 between the outer ends of the clamping plates enables a leg of an animal to be moved laterally into the space between them.

The inner face of each clamping plate 36 is provided with an inflatable elastic lining or pad 40 which has its edges turned around the periphery of the clamping piece and suitably secured and sealed thereto as shown in FIGURE 5. Thus when air under pressure is supplied to the spaces between the clamping plates 36 and the respective inner linings or pads 40 thereon, the latter are expanded as shown by broken lines in FIGURE 4 so as to surround and securely grip the leg previously inserted therebetween.

Each elastic lining or pad 40 is preferably formed of composite sheet material as shown in FIGURE 5 wherein an inner layer 40a of sheet rubber or the like has an outer layer 40b of stretchable net-like fabric secured thereto. This outer layer of fabric is provided principally to control the expansion of the rubber sheet by restraining the latter from bulging excessively where zones of weakness happen to be present, though in addition, it provides a frictional surface which grips the leg more reliably. In addition, a non-stretchable or tension tape 40c is preferably arranged between the rubber sheet and the fabric covering and centrally between and parallel to the sides of the pad to restrain the expansion of the central zones of the pads so that hollow portions are formed therein about the leg as also indicated in broken lines in FIGURE 4.

As shown in FIGURE 3, a valve assembly is arranged within each of the hollow trunnions 30 on the support block 28 and the latter is formed with air passages 42 which connect the interior of the tubular depending arm 16 to the inner end of each valve assembly.

Each valve assembly comprises a normally closed and axially slidable inlet valve 44 which is urged outwardly into engagement with a seating by a spring 46. This valve may be opened in opposition to its spring by imparting an inward pressure to the projecting outer end of a slidable pusher pin 48 arranged forwardly of and coaxially with the inlet valves. The inner end of this pin 48 is arranged to bear against the inlet valve but is not connected thereto.

An actuating arm 50 for the inlet valve is pivoted to the respective clamp body 32 by a transverse pin 52 and this arm extends downwardly in front of the outer end of the pin 48 and then forwardly below the space between the opposed clamping plates 36. Thus, when the leg of an animal is being moved laterally inwards through the gap 38 and into the space between the clamping plates, it engages and displaces the actuating arm 50 thereby to cause the inlet valve to open so that air under pressure passes from the hollow depending arm 16 to inflate the opposed elastic linings or pads 40 of the clamp thereby to grip the respective leg of the animal as hereinafter further described.

An upwardly and downwardly movable cradle is preferably arranged below the aforesaid loading station for the carriers to support an animal on its back at a convenient height for the attachment of its legs to the clamps of a corresponding carrier. The said loading cradle, which does not form a part of this invention, is not shown in the drawings. Thus each leg may be inserted in turn between the inflatable pads of the respective clamp and as they are thus inserted the pads are automatically inflated to grip the leg. Preferably the distance between the lower ends of the depending arms 16 is rather greater than the length of the animal so that the forelegs incline upwardly and forwardly while the hind legs incline upwardly and rearwardly to some extent and it will be understood that the transverse pivotal mountings of the U-shaped clamp bodies 32 enable the clamps to assume corresponding inclinations.

A slidable exhaust valve 54 provided with a forwardly projecting hollow stem 55 is arranged in advance of and coaxially with the inlet valve 44 of each clamp, the aforesaid slidable pusher pin 48 for the inlet valve being mounted in the said hollow stem. A tension spring 56 urges the exhaust valve forwardly so that it normally engages a corresponding front seating and thereby close the forward end of an internal chamber 58 which is normally closed at its rear end by the inlet valve 44.

The exhaust valve 54 may be opened in opposition to the spring 56 by means of a second arm 60 pivoted on the aforesaid pin 52 and arranged behind the aforesaid actuating arm 50 for the inlet valve. This arm 60 is operable manually to press the exhaust valve inwardly whereby it disengages its seating at the forward end of the internal chamber 58 and engages a rear seating therein. Thus air under pressure may then escape forwardly from the chamber 58 so that the elastic linings or pads 40 are deflated, while the engagement between the exhaust valve and its rear seating prevents the inflow of compressed air into the chamber from the depending arm 16 even if the inlet valve is open as it is if the leg of an animal is already arranged between the clamping plates.

Consequently, if the gripping pads 40 should be inflated before the leg of the animal is correctly located therebetween, the pads may be deflated by operation of the pivoted arm 60 to enable the leg to be re-positioned even though the inlet valve 44 is at this time retained in its open position by the leg.

The internal chamber 58 of the valve is connected by a series of radial holes 62 in the trunnion to an external circumferential groove 64 in the aforesaid resilient plastic sealing bush 34 thereon and this groove is in constant communication with the adjacent inner ends of passages 66 formed in the arms of the U-shaped clamp body 32 and each of which communicates at its outer end with the interior of the respective inflatable pad 40.

A common control valve 68 mounted on the beam 15 of the carrier (FIGURE 2) is connected by a flexible tube 70 to a source of compressed air while further flexible tubes 72 connect this valve to the adjacent upper ends of the two depending tubular arms 16 of the carrier.

The control valve 68 normally connects the supply tube 70 to the tubes 72 but as each carrier in turn closely approaches the aforesaid animal discharge or unloading station, an actuating arm 74 on the valve engages a suitably positioned stop whereby each of the tubes 72 is connected to an exhaust port 76. At this time, the inlet valve 44 of each clamp is held open by the respective leg of the supported animal so that when the actuating arm 74 is displaced, the inflated pads of the four clamps are simultaneously connected to exhaust. The pads are thus deflated to release the four legs simultaneously so that the animal drops from the carrier and preferably onto a reverting device arranged therebelow at the discharge station so that the animal rolls over onto its feet on the floor. The reverting device does not form a part of this invention and is not shown in the drawings.

As the animal drops from the carrier, the inlet valve 44 of each clamp is closed by its spring 46. The closing movement of each inlet valve is suddenly arrested as it engages its seating, but the inertia of the associated pusher pins 48 causes them to undergo small additional movements so that their inner ends separate from the forward faces of the inlet valves. Each pusher pin has an axial passage which extends from its inner end to a position close to its projecting forward end and where it communicates with the external atmosphere by a diametrical hole 49.

Thus, although the inlet valves 44 may close while the pads 40 are still partly inflated, air continues to exhaust through the pusher pins 48 until the pads are fully deflated.

FIGURES 7 and 8 show a side entry clamp and control valve of modified construction. As in the clamp previously described, the clamp incorporates a U-shaped body member 32 which is pivotally supported on a member 28 secured to the lower end of a depending tubular arm 16.

Each arm of the clamp body is fitted with two inwardly projecting inflatable pads 78 arranged side by side and in transverse opposition to the corresponding pads on the other arm. These pads, which are preferably interchangeable, are moulded from rubber or other suitable material and have open backs to receive clamping plates 80 by which they are secured and sealed to inclined seatings on the respective arms, the said plates being provided with holes which connect the interior of each pad to the air passages 66 in the respective arms.

The said pads, which preferably have external linings of net fabric as previously described, are moulded to the shape shown in full lines in FIGURE 7 and when in this deflated condition, the outer portion of each pad is preferably disposed substantially in abutting engagement with the corresponding portion of the opposite pad on the other arm. These abutting portions are, however, sufficiently flexible to be readily bent inwardly as the leg of an animal is moved laterally through the gap 38 into the relatively large central space between the four pads, while when the latter are inflated, they are shaped approximately as shown in broken lines in the figure so as to grip the leg securely.

As shown in FIGURE 8, the clamp 32 is secured to one projecting end of a transverse spindle 81 which is rotatively mounted in the support member 28 while the body of a second and identical clamp is similarly secured to the opposite end of the spindle. The clamps of each transversely opposed pair thereof are thus rigidly connected by the spindle 81 and so are constrained to turn in unison.

The spindle 81 is formed with an axial air passage and with a central diametrical hole which connects the axial passage at all times to the interior of the depending arm. A slidable valve 85 arranged coaxially with the spindle is arranged within a valve chamber 58 in the clamp body and between inner and outer seatings therefor. When this valve is in contact with its inner seating, communication between the valve chamber and the air passage in the spindle is cut-off and the chamber communicates with the atmosphere through an exhaust passage in the outer valve seat and through longitudinal grooves which surround a forwardly projecting stem 94 on the valve.

When the valve engages its outer seating, the exhaust passage is closed and the valve chamber 58 communicates freely with the interior of the depending tube 16 as in the construction previously described.

A pivoted arm 50 is arranged as previously described so as to be displaced in a clockwise direction in FIGURE 8 as the leg of the animal is inserted sidewise into the clamp. This pivoted arm, however, is constantly urged in the anti-clockwise direction by a torsion spring so that a tail on the arm normally bears against the outer face of a further and upwardly extending arm 95 mounted on the same pivot pin 52. The inner face of this further arm bears against the projecting end of the valve stem 94 so that the valve is normally maintained in contact with its inner seating in opposition to a light spring 96 which urges the valve outwardly assisted by the pressure of air in the depending arm. Thus the pads 78 are normally deflated.

When, however, the arm 50 is displaced clockwise by the insertion of the leg into the clamp, the tail on that arm disengages the further arm 95 and the valve is moved forwardly by the spring 96 to disengage its inner or inlet seating and engage its outer or exhaust seating so that the four pads 78 are simultaneously inflated to grip the leg.

Should it be necessary, however, to reposition the leg, the valve may be pushed inwardly by means of the arm 95 so as to deflate the pads which are again automatically inflated when the arm 95 is subsequently released.

FIGURES 9 and 10 show still another form of clamp comprising an upright tubular body 82 which is pivotally mounted on a support member 28 so as to be free to turn through a sufficient angle about a substantially transverse axis. For this purpose a retaining screw 84 engaging a laterally projecting pivot pin on the clamp body has its head accommodated in a circumferential clearance slot in a bearing on the support.

A tubular lining 86 of rubber or the like extends through the tubular body of the clamp and has its ends returned outwardly over the ends of the latter and secured by clamping bands 88. The space between the elastic lining 86 and the interior of the tubular body member 82 is connected by a flexible tube 90 to a valve assembly 92 on the support member 28. This valve assembly may include a pivoted actuating member 97 which is moved manually in one direction to inflate the lining 86 and in the opposite direction to deflate it.

The clamp shown in FIGURES 9 and 10 thus differs from the clamps previously described in that it does not have a side entry opening for the animal's leg which must therefore be inserted upwardly through the open lower end of the clamp. If desired, however, the tubular body and the inflatable tube may be of discontinuous form to provide a side entry opening therein.

When the leg of the animal is inserted in the clamp, the valve actuating member 97 is manually operated to cause compressed air to enter and expand the inflatable tube, though if desired, automatic inflation could be achieved by arranging a valve operating member above the tubular clamp for engagement by the extremity of the leg.

When the lining tube is inflated, it assumes an infolded shape which is generally similar to that indicated in broken lines in FIGURE 10, though the number of radial folds is variable and appears to depend on zones of weakness adventitiously present in the sheet material. If desired, however, the number and spacing of the folds could be predetermined by providing the rubber tube with preformed weakened zones.

What is claimed is:

1. An animal leg clamp assembly comprising a transversely opposed pair of individual leg clamps, each leg clamp comprising a body having spaced portions between which a leg may be arranged, an inflatable gripping member of resilient or flexible material so arranged on the body that it expands inwardly to grip the respective leg of an animal, valve means individual to each clamp, said valve means being operable to cause the respective inflatable member to be inflated and deflated alternatively, common supporting means for the two clamps, further valve means common to the two clamps, and means operable to actuate said further valve means thereby to cause the two clamps to release simultaneously.

2. An animal leg clamp assembly comprising four leg clamps arranged in two transversely opposed and longitudinally spaced pairs thereof, means supporting said clamps substantially in a common horizontal plane, each of said clamps comprising a body of tubular form, an inflatable tubular member arranged within the tubular body whereby when inflated, it expands inwardly to grip the respective leg therewithin, and valve means individual to the clamp, said valve means being operable to cause said inflatable member to be inflated and deflated alternatively, further valve means common to the several clamps, and means operable to actuate said further valve means whereby the inflatable members of the several clamps are deflated simultaneously.

3. An animal leg clamp assembly comprising four leg clamps arranged substantially in a common horizontal plane and in two transversely opposed and longitudinally spaced pairs thereof, common supporting means for the clamps, each of said clamps comprising a body having two substantially horizontal and substantially parallel arms which are spaced apart whereby a gap for the side entry of the respective leg of an animal is defined between the free ends thereof, at least one inflatable member of resilient or flexible material carried by each arm of the body and disposed at the inner side thereof, whereby said inflatable members when inflated, expand inwardly to grip the respective leg therebetween, and valve means individual to each clamp, said valve means being operable to cause said inflatable members to be inflated and deflated in unison, and including further valve means common to the several leg clamps, and means operable to actuate said further valve means thereby to cause the inflatable members of the several clamps to be deflated simultaneously.

4. An animal leg clamp assembly comprising supporting means, a depending arm having its upper end pivotally connected to said supporting means whereby it may turn about a transverse axis, a support member on the free lower end of the arm, a transversely opposed pair of individual leg clamps carried by said support member and projecting laterally from opposite sides thereof, each leg clamp comprising a body having spaced portions between which a leg may be arranged, an inflatable gripping member of resilient or flexible material so arranged on the body that when inflated, it expands inwardly to grip the respective leg of an animal, and valve means individual to each clamp, said valve means being operable to cause the respective inflatable member to be inflated and deflated alternatively, and including further valve means common to the two clamps, means operable to actuate said further valve means, thereby to cause the two clamps to release simultaneously, and means operable to secure said depending pivoted arm in alternative angular positions.

5. An animal leg clamp assembly comprising supporting means, a spaced pair of depending arms, each arm having its upper end pivotally connected to said supporting means so as to turn about a transverse axis whereby the lower ends of said arms may be moved towards and from each other, means for securing each arm in alternative angular positions, a support member on the lower end of each depending arm, a transversely opposed pair of individual leg clamps carried by each of said support members and projecting laterally from opposite sides thereof, the four leg clamps being arranged substantially in a common horizontal plane, each of said clamps comprising a body having two substantially horizontal and substantially parallel arms which are spaced apart whereby a gap for the side entry of the respective leg of an animal is defined between the free ends thereof, at least one inflatable member of resilient or flexible material carried by each arm of the body and disposed at the inner side thereof whereby said inflatable members when inflated, expand upwardly to grip the respective leg therebetween, and valve means individual to each clamp, said valve means being operable to cause said inflatable members to be inflated and deflated in unison, and including further valve means common to the several leg clamps, and means operable to actuate said further valve means thereby to cause the inflatable members of the several clamps to be deflated simultaneously.

6. An animal leg clamp comprising supporting means, a depending arm having its upper end pivotally connected to said supporting means whereby it may turn about a transverse axis, means operable to secure said depending pivoted arm in alternative angular positions, a support member on the free lower end of the arm, a transversely opposed pair of individual leg clamps carried by said support member and projecting laterally from opposite sides thereof, each leg clamp comprising a body having spaced portions between which a leg may be arranged, an inflatable gripping member of resilient or flexible material so arranged on the body that when inflated, it expands inwardly to grip the respective leg of an animal, valve means individual to each clamp, said valve means being operable to cause the respective inflatable member to be inflated and deflated alternatively, movable valve actuating means so disposed on each clamp body as to be engaged by the leg of an animal inserted in the clamp thereby to cause said valve means to be actuated whereby the respective inflatable member is inflated to grip the leg, and means operable manually to cause said valve means to be actuated whereby said inflatable member is deflated, and including further valve means common to the two clamps, and means operable to actuate said further valve means thereby to cause the two clamps to release simultaneously.

7. An animal leg clamp assembly comprising supporting means, a spaced pair of depending arms, each arm having its upper end pivotally connected to said supporting means so as to turn about a transverse axis whereby the lower ends of said arms may be moved towards and from each other, means for securing each arm in alternative angular positions, a support member on the lower end of each depending arm, transversely opposed pair of individual leg clamps carried by each of said support members and projecting laterally from opposite sides thereof, the four leg clamps being arranged substantially in a common horizontal plane, each of said clamps comprising a body having two substantially horizontal and substantially parallel arms which are spaced apart whereby a gap for the side entry of the respective leg of an animal is defined between the free ends thereof, at least one inflatable member of resilient or flexible material carried by each arm of the body and disposed at the inner side thereof whereby said inflatable members were inflated, expanded inwardly to grip the respective leg therebetween, and valve means individual to each clamp, said valve means being operable to cause said inflatable members to be inflated and deflated in unison, a pivoted valve actuating member so disposed on each clamp as to be displaced by the insertion of a leg into the clamp whereby said valve means is operated to cause the respective inflatable members to be inflated thereby to grip the leg, and a further valve actuating member on each clamp operable manually to cause said inflatable members to be deflated, and including further valve means common to the several leg clamps, and means operable to actuate said further valve means thereby to cause the inflatable members of the several clamps to be deflated simultaneously.

8. An animal leg clamp comprising a body, two approximately parallel arms on the body, said arms being spaced apart whereby a gap for the side entry of a leg is formed between the free ends thereof, at least one inflatable member of resilient or flexible material mounted on and disposed at the inner side of each arm whereby said members when inflated expand inwardly towards each other to grip the leg therebetween, valve means operable to cause said inflatable members to be inflated and deflated in unison, an actuating member for said valve means, and means movably supporting said actuating member on the body in a position such that said member is displaced by a leg inserted into the clamp through said gap, thereby to actuate said valve means whereby the said inflatable members are inflated in unison.

9. An animal leg clamp comprising a body, two approximately parallel arms on the body, said arms being spaced apart whereby a gap for the side entry of a leg is formed between the free ends thereof, at least one inflatable member of resilient or flexible material mounted on and disposed at the inner side of each arm whereby said members when inflated expand inwardly towards each other to grip the leg therebetween, valve means operable to cause said inflatable members to be inflated and deflated in unison, said valve means comprising a reciprocable valve member arranged within a chamber therefor, seatings for said valve arranged on opposite sides of said valve member so as to be engagable alternatively thereby, one of said seatings being formed with an inlet passage for compressed air and the other seating being formed with an exhaust passage, a valve-actuating arm pivotally mounted on the body so as to be displaced by the leg of an animal inserted into the clamp whereby said valve member is caused to disengage its inlet seating and engage its exhaust seating, means operable manually to cause said valve member to reengage its inlet seating while a leg is arranged within the clamp, and means forming passages connecting said valve chamber to the interior of each of said inflatable members.

References Cited by the Examiner
UNITED STATES PATENTS 2,830,585  4/1958  Weiss _____ 128—166
2,968,907  1/1961  Beinheim et al. _____ 56—332

FOREIGN PATENTS 549,294  11/1942  Great Britain.

SAMUEL KOREN, *Primary Examiner.*
HUGH R. CHAMBLEE, *Examiner.*